US012668727B2

(12) United States Patent
Mikami

(10) Patent No.: US 12,668,727 B2
(45) Date of Patent: Jun. 30, 2026

(54) ADHESIVE SHEET AND ELECTRONIC COMPONENT

(71) Applicant: FUJIFILM Corporation, Tokyo (JP)

(72) Inventor: Tatsuo Mikami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1029 days.

(21) Appl. No.: 17/706,625

(22) Filed: Mar. 29, 2022

(65) Prior Publication Data

US 2022/0220350 A1 Jul. 14, 2022

Related U.S. Application Data

(63) Continuation of application No. PCT/JP2020/034630, filed on Sep. 14, 2020.

(30) Foreign Application Priority Data

Sep. 30, 2019 (JP) ................................. 2019-179972

(51) Int. Cl.
*C09J 7/38* (2018.01)
*C09J 7/10* (2018.01)
*C09J 163/00* (2006.01)

(52) U.S. Cl.
CPC ............... *C09J 163/00* (2013.01); *C09J 7/10* (2018.01); *C09J 7/38* (2018.01); *C09J 2400/16* (2013.01); *C09J 2463/00* (2013.01); *C09J 2467/00* (2013.01); *C09J 2479/00* (2013.01)

(58) Field of Classification Search
CPC .. C09J 163/00; C09J 2463/00; C09J 2467/00; C09J 2479/00; C08K 2201/01
See application file for complete search history.

(56) References Cited

U.S. PATENT DOCUMENTS

| | | | |
|---|---|---|---|
| 5,549,955 A | * | 8/1996 | Kawamata ............... G11B 5/66 |
| | | | 428/65.3 |
| 2006/0266435 A1 | | 11/2006 | Yang et al. |
| 2007/0230054 A1 | * | 10/2007 | Takada .................... G11B 5/78 |
| | | | 360/134 |

(Continued)

FOREIGN PATENT DOCUMENTS

| | | |
|---|---|---|
| CN | 1548494 | 11/2004 |
| CN | 104910823 | 9/2015 |

(Continued)

OTHER PUBLICATIONS

"International Search Report (Form PCT/ISA/210) of PCT/JP2020/034630," mailed on Nov. 24, 2020, with English translation thereof, pp. 1-6.

(Continued)

*Primary Examiner* — Catherine S Branch
*Assistant Examiner* — Huihong Qiao
(74) *Attorney, Agent, or Firm* — JCIPRNET

(57) ABSTRACT

Provided are an adhesive sheet including an adhesive layer that contains a FeCo-based magnetic powder having an average primary particle size of 100 nm or less and a coercive force Hc of 400 Oe or more, and has a thickness variation of less than 10%, and an electronic component including an adhesive layer that contains a FeCo-based magnetic powder having an average primary particle size of 100 nm or less and a coercive force Hc of 400 Oe or more, and has a thickness variation of less than 10%.

16 Claims, 1 Drawing Sheet

(56)         References Cited

U.S. PATENT DOCUMENTS

| | | |
|---|---|---|
| 2014/0374645 A1 | 12/2014 | Kikuchi et al. |
| 2016/0083626 A1 | 3/2016 | Ebe et al. |
| 2017/0250134 A1 | 8/2017 | Sturcken et al. |
| 2018/0218814 A1 | 8/2018 | Yoshida et al. |

FOREIGN PATENT DOCUMENTS

| | | |
|---|---|---|
| CN | 107615412 | 1/2018 |
| CN | 108463527 | 8/2018 |
| JP | H01289883 | 11/1989 |
| JP | 2004319527 | 11/2004 |
| JP | 2008288370 | 11/2008 |
| JP | 2014189015 | 10/2014 |
| JP | 2015028830 | 2/2015 |
| JP | 2015187260 | 10/2015 |
| JP | 2015201581 | 11/2015 |
| JP | 2016222844 | 12/2016 |
| KR | 100623518 | 9/2006 |
| TW | 201610067 | 3/2016 |
| TW | 201706364 | 2/2017 |
| WO | 2017170492 | 10/2017 |
| WO | 2017175481 | 10/2017 |
| WO | 2018194099 | 10/2018 |
| WO | 2018194100 | 10/2018 |

OTHER PUBLICATIONS

"Written Opinion of the International Searching Authority (Form PCT/ISA/237)" of PCT/JP2020/034630, mailed on Nov. 24, 2020, with English translation thereof, pp. 1-8.

Office Action of China Counterpart Application, with English translation thereof, issued on Nov. 20, 2023, pp. 1-12.

Office Action of Taiwan Counterpart Application, with English translation thereof, issued on Dec. 19, 2023, pp. 1-11.

Office Action of China Counterpart Application, with English translation thereof, issued on Apr. 14, 2023, pp. 1-12.

Office Action of Japan Counterpart Application, with English translation thereof, issued on Jan. 17, 2023, pp. 1-6.

\* cited by examiner

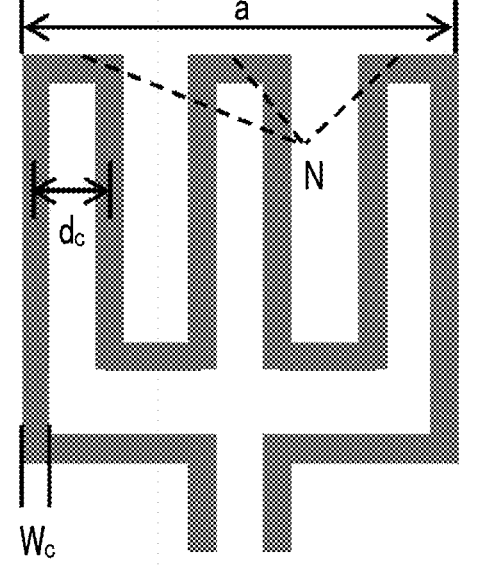
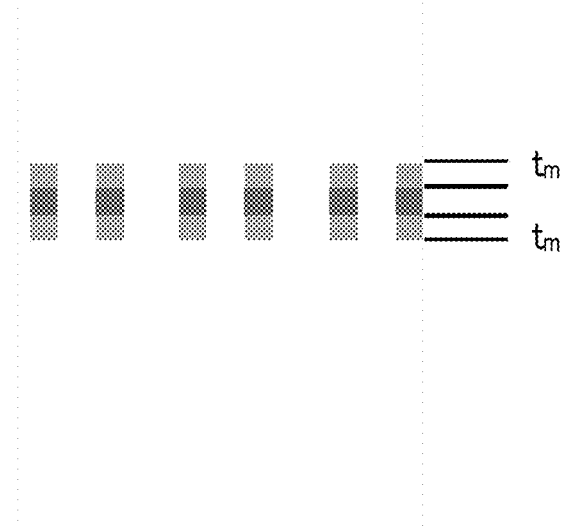

ADHESIVE SHEET AND ELECTRONIC COMPONENT

CROSS-REFERENCE TO RELATED APPLICATIONS

This application is a Continuation of PCT International Application No. PCT/JP2020/034630 filed on Sep. 14, 2020, which claims priority under 35 U.S.C. § 119(a) to Japanese Patent Application No. 2019-179972 filed on Sep. 30, 2019. Each of the above applications is hereby expressly incorporated by reference, in its entirety, into the present application.

BACKGROUND OF THE INVENTION

1. Field of the Invention

The present invention relates to an adhesive sheet and an electronic component, and more particularly to an adhesive sheet containing a magnetic powder and an electronic component having an adhesive layer containing a magnetic powder.

2. Description of the Related Art

In recent years, it has been studied to use an adhesive sheet containing a magnetic powder as an adhesive sheet for an electronic component (see, for example, JP2014-189015A).

SUMMARY OF THE INVENTION

It is said that containing a magnetic powder in an adhesive sheet for an electronic component leads to enhancement of a magnetic permeability (specifically, real part $\mu'$ of complex magnetic permeability) of the adhesive sheet, thereby enabling reduction in size of the electronic component.

An electronic component for a high-frequency device such as a personal component, an automobile, a mobile information terminal such as a mobile phone, a flat panel display, a game device, a road information system, and a wireless local area network (LAN) is used, for example, in a filter circuit, a smoothing circuit, a matching circuit, and the like, and can play a role of noise reduction, voltage stabilization and the like of the high-frequency device. From the viewpoint of performance stability, it is desired that such an electronic component has no large difference in inductance depending on the position (that is, inductance variation is small). For the adhesive sheet used for the electronic component, it is desired that a magnetic permeability $\mu'$ is high and a loss tangent tan $\delta$ is small at an operating frequency of the electronic component from the viewpoint of reduction in size and low loss of the electronic component. The loss tangent tan $\delta$ is calculated by tan $\delta=\mu''/\mu'$ from a real part $\mu'$ of a complex magnetic permeability and an imaginary part $\mu''$ of the complex magnetic permeability.

According to the study of the present inventor, with respect to the above points, further improvement is required for the adhesive sheet in the related art, which contains a magnetic powder.

An object of an aspect of the present invention is to provide an adhesive sheet containing a magnetic powder, which has a high magnetic permeability $\mu'$, a small loss tangent tan $\delta$, and can contribute to the suppression of a variation in inductance of an electronic component.

An aspect of the present invention relates to an adhesive sheet comprising an adhesive layer containing a FeCo-based magnetic powder having an average primary particle size of 100 nm or less and a coercive force Hc of 400 Oe or more, and having a thickness variation of less than 10%.

In addition, another aspect of the present invention relates to an electronic component comprising an adhesive layer containing a FeCo-based magnetic powder having an average primary particle size of 100 nm or less and a coercive force Hc of 400 Oe or more, and having a thickness variation of less than 10%.

The adhesive sheet and the electronic component can each have the following aspects.

In one aspect, the adhesive layer may further contain a thermosetting resin.

In one aspect, the thermosetting resin may be an epoxy resin.

In one aspect, the adhesive layer may further contain a thermoplastic resin.

In one aspect, a glass transition temperature Tg of the thermoplastic resin may be 30° C. or lower.

In one aspect, the adhesive layer may further contain a compound containing a polyalkyleneimine chain and a polyester chain.

In one aspect, a proportion of the polyalkyleneimine chain in the compound may be less than 5.0% by mass.

In one aspect, the average primary particle size of the FeCo-based magnetic powder may be 30 nm or more and 100 nm or less.

In one aspect, the coercive force Hc of the FeCo-based magnetic powder may be 400 Oe or more and 1500 Oe or less.

In one aspect, the thickness variation of the adhesive layer may be 5% or more and less than 10%.

According to one aspect of the present invention, it is possible to provide an adhesive sheet containing a magnetic powder, which has a high magnetic permeability $\mu'$, a small loss tangent tan $\delta$, and can contribute to the suppression of an inductance variation of an electronic component. In addition, according to one aspect of the present invention, it is possible to provide an electronic component having an adhesive layer having a high magnetic permeability $\mu'$ and a small loss tangent tan $\delta$, and having a small inductance variation.

BRIEF DESCRIPTION OF THE DRAWINGS

FIG. 1 is a diagram showing a planar inductance assumed for calculation of an inductance variation in Examples.

DESCRIPTION OF THE PREFERRED EMBODIMENTS

[Adhesive Sheet]

An aspect of the present invention relates to an adhesive sheet comprising an adhesive layer containing a FeCo-based magnetic powder having an average primary particle size of 100 nm or less and a coercive force Hc of 400 Oe or more, and having a thickness variation of less than 10%.

In the present invention and the present specification, the term "sheet" is used synonymously with the term "film". In addition, with respect to the "adhesive sheet" and the "adhesive layer", the term "adhesive" refers to a state in which the adhesive sheet and the adhesive layer can be adhered to an adjacent portion (layer, substrate, or the like) after a bonding step.

Hereinafter, the above adhesive sheet will be described in more detail.

<Adhesive Layer>

(Magnetic Powder)

The adhesive sheet contains a FeCo-based magnetic powder in the adhesive layer. In the present invention and the present specification, the term "-based" is used to mean "containing". That is, the FeCo-based magnetic powder is a magnetic powder containing Fe and Co, and can be a FeCo-based alloy powder. The FeCo-based magnetic powder is an advantageous magnetic powder in increasing a magnetic permeability $\mu'$ and reducing a loss tangent tan $\delta$ in a high frequency band. The FeCo-based magnetic powder need only contain Fe and Co and have an average primary particle size of 100 nm or less and Hc of 400 Oe or more, and the composition thereof is not limited.

Average Primary Particle Size

The average primary particle size of the FeCo-based magnetic powder is 100 nm or less. This point can contribute to the reduction in loss tangent tan $\delta$, especially reduction in loss tangent tan $\delta$ in the high frequency band (for example, about 1 gigahertz (GHz)) recently used as an operating frequency of the electronic component. Details are as follows. An eddy current loss $P_e$ caused by an eddy current generated in metal particles has a relationship of "$P_e \propto D^2 f^2$" with a particle size D and a frequency f of an applied magnetic field. On the other hand, with respect to the loss tangent tan $\delta$, the large eddy current loss $P_e$ causes an increase in tan $\delta$. Considering the use in the high frequency band, in order to reduce $P_e$, it is desired to reduce D from the above relationship. From such viewpoint, the average primary particle size of the FeCo-based magnetic powder is 100 nm or less, preferably 90 nm or less, more preferably 80 nm or less, still more preferably 70 nm or less, still more preferably 60 nm or less, and still more preferably 50 nm or less. In addition, from the viewpoint of stability of magnetic properties, the average primary particle size of the FeCo-based magnetic powder is preferably 5 nm or more, more preferably 10 nm or more, still more preferably 20 nm or more, still more preferably 30 nm or more, and still more preferably 40 nm or more.

In the present invention and the present specification, average primary particle sizes of various powders are values measured by the following method using a transmission electron microscope, unless otherwise noted.

The powder is imaged at an imaging magnification of 100,000 using a transmission electron microscope, and the image is printed on printing paper, is displayed on a display, or the like so that the total imaging magnification is 500,000 to obtain an image of particles constituting the powder. A target particle is selected from the obtained image of particles, an outline of the particle is traced by a digitizer, and a size of the particle (primary particle) is measured. The primary particles refer to independent particles without being aggregated.

The measurement described above is performed regarding 500 particles randomly extracted. An arithmetic average of the particle sizes of 500 particles thus obtained is an average primary particle size of the powder. As the transmission electron microscope, a transmission electron microscope H-9000 manufactured by Hitachi, Ltd. can be used, for example. In addition, the measurement of the particle size can be performed by known image analysis software, for example, image analysis software KS-400 manufactured by Carl Zeiss. In the present invention and the present specification, the powder means an aggregate of a plurality of particles. For example, the magnetic powder means an aggregate of a plurality of magnetic particles. Further, the aggregate of the plurality of particles not only includes an aspect in which particles constituting the aggregate directly come into contact with each other, but also includes an aspect in which one or more other components which will be described below are interposed between the particles. The term "particle" is used to describe a powder in some cases.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size of the primary particles constituting the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter is a value obtained by a circle projection method.

The average primary particle size of the magnetic powder contained in the adhesive layer can be obtained, for example, by performing the above measurement on the magnetic powder used for producing the adhesive layer or on the magnetic powder in the same lot as the magnetic powder. In addition, for example, by extracting the magnetic powder from the adhesive layer by a known method and performing the above measurement on the extracted magnetic powder, the average primary particle size of the magnetic powder contained in the adhesive layer can be obtained. The same applies to the coercive force Hc of the magnetic powder.

Coercive Force Hc

The coercive force Hc of the FeCo-based magnetic powder is 400 Oersted (Oe) or more. Regarding the unit, 1 [kOe]=$10^6/4\pi$ [A/m]. The fact that the coercive force Hc of the FeCo-based magnetic powder is 400 Oe or more can contribute to the reduction in loss tangent tan $\delta$, especially reduction in loss tangent tan $\delta$ in the high frequency band (for example, about 1 gigahertz (GHz)) recently used as an operating frequency of the electronic component. From this point of view, the coercive force Hc of the FeCo-based magnetic powder is preferably 500 Oe or more, more preferably 600 Oe or more, and still more preferably 700 Oe or more. In addition, from the viewpoint of easiness of achieving both the high magnetic permeability $\mu'$ and the small loss tangent tan $\delta$ in the high frequency band, the coercive force Hc of the FeCo-based magnetic powder is preferably 2000 Oe or less, more preferably 1800 Oe or less, still more preferably 1500 Oe or less, and still more preferably 1200 Oe or less.

The proportion (filling rate) of the FeCo-based magnetic powder in the adhesive layer is, for example, in a range of 50% to 95% by mass, and preferably in a range of 60% to 80% by mass, with respect to a total amount of a solid content (that is, a component excluding a solvent) of the adhesive layer.

The coercive force Hc of the magnetic powder can be measured by a known vibrating sample magnetometer. In the present invention and the present specification, the coercive force Hc is a value measured at a measurement temperature of 25° C.±1° C. The measurement temperature is an atmosphere temperature around a powder to be measured in a case of the measurement of the coercive force.

(Thickness Variation)

A thickness variation of the adhesive layer containing the FeCo-based magnetic powder described above is less than 10%. This point can contribute to reduction in inductance variation of the electronic component obtained through the bonding step using the adhesive sheet. From the viewpoint of further reducing the inductance variation, the thickness variation is preferably 9% or less, more preferably 8% or less, and from the viewpoint of reducing the inductance variation, the value of the thickness variation is preferably smaller. In addition, the thickness variation may be, for example, 0% or more, more than 0%, 1% or more, 2% or more, 3% or more, 4% or more, or 5% or more. The thickness variation can be controlled, for example, by a type of a component (for example, a dispersing agent) used for producing a composition for forming an adhesive layer, dispersion conditions, and the like. This point will be further described below.

In the present invention and the present specification, the thickness variation of the adhesive layer is a value calculated by multiplying a value obtained by dividing a difference between the maximum value and the minimum value among 10 film thickness measurement values obtained by a known film thickness measurement device (for example, a micrometer) at 10 randomly selected locations of the adhesive layer by an arithmetic average of the 10 measurement values by 100. That is, "Thickness variation=[(maximum value−minimum value)/arithmetic average]×100" is satisfied. For the adhesive layer contained in the electronic component after the bonding step, the film thickness measurement is performed on this adhesive layer. For the adhesive layer contained in the adhesive sheet before the bonding step, the film thickness measurement of the adhesive layer is performed after the adhesive sheet is heat-treated in a heating furnace having a furnace temperature of 150° C. for 2 hours. In addition, the thickness of the adhesive layer need only be determined according to the use of the electronic component including the adhesive layer, and is not particularly limited. In one aspect, the thickness of the adhesive layer may be in a range of 0.5 to 80 μm, and preferably in a range of 10 to 60 μm, as the arithmetic average of the above 10 measurement values.

(Other Components)

Thermosetting Resin

The adhesive layer of the adhesive sheet contains at least the FeCo-based magnetic powder described above, and may optionally contain one or more of other components. Examples of such a component include a thermosetting resin. The adhesive sheet can function as a thermosetting adhesive sheet by containing a thermosetting resin in the adhesive layer. This point is preferable from the viewpoint of improving the adhesive strength of the adhesive layer. Examples of the thermosetting resin include various thermosetting resins, such as an epoxy resin, a phenol resin, an acrylic resin, a silicone resin, a urethane resin, a urea resin, and a melamine resin, and an epoxy resin is suitable from the viewpoint of the adhesive strength and the durability.

Examples of the epoxy resin include various epoxy resins, such as a bisphenol A epoxy resin, a bisphenol F epoxy resin, a bisphenol S epoxy resin, a bisphenol AF epoxy resin, a dicyclopentadiene epoxy resin, a trisphenol epoxy resin, a naphthol novolak epoxy resin, a phenol novolak epoxy resin, a tert-butyl-catechol epoxy resin, a naphthalene epoxy resin, a naphthol epoxy resin, an anthracene epoxy resin, a glycidylamine epoxy resin, a glycidyl ester epoxy resin, a cresol novolak epoxy resin, a biphenyl epoxy resin, a linear aliphatic epoxy resin, an epoxy resin having a butadiene structure, an alicyclic epoxy resin, a heterocyclic epoxy resin, an epoxy resin containing a spiro ring, a cyclohexanedimethanol epoxy resin, a naphthylene ether epoxy resin, and a trimethylol epoxy resin. The epoxy resin may be used alone or in combination of two or more at an arbitrary ratio. In the present invention and the present specification, in a case where the adhesive layer contains a thermosetting resin, at least a part of the thermosetting resin contained in the adhesive layer may be contained in the form after the thermosetting. For example, in the adhesive layer contained in the electronic component after the bonding step, at least a part of the thermosetting resin can be usually contained in the form after the thermosetting. For example, in the adhesive layer contained in the electronic component after the bonding step, at least a part of the epoxy group which is a reactive group of the epoxy resin may be contained in the form after the reaction. The same applies to various components having a reactive group. For details of the epoxy resin, the descriptions disclosed in paragraphs 0017 to 0022 of JP2015-187260A and paragraphs 0022 and 0023 of JP2012-227406A can be referred to. The content of the thermosetting resin in the adhesive layer is preferably 5 to 40 parts by mass, and more preferably 10 to 20 parts by mass with respect to 100 parts by mass of the FeCo-based magnetic powder. In a case where two or more types of the thermosetting resins are used in combination, the above content is the total content of two or more types of the thermosetting resins. The same applies to the contents of other components.

Examples of an additive that can be used in combination with a thermosetting resin, such as an epoxy resin, include components that can function as a curing agent, such as a phenol compound, an amine compound, an imidazole compound, and an acid anhydride. In addition, known additives, such as a coupling agent and a surfactant, can also be used regardless of whether or not the adhesive layer contains a thermosetting resin. The additive can be used in any amount. For details of the additive, the descriptions disclosed in paragraphs 0024 to 0028 of JP2012-227406A can be referred to, for example.

Thermoplastic Resin

The adhesive layer of the adhesive sheet may also contain a thermoplastic resin. In the present invention and the present specification, the term "resin" means a polymer and also includes rubber and an elastomer. Polymers include homopolymers and copolymers. Rubber includes natural rubber and synthetic rubber. In addition, the elastomer is a polymer that exhibits elastic deformation. In one aspect, the thermoplastic resin may contribute to the development of adhesiveness of the adhesive layer. From this point of view, preferred thermoplastic resins include rubber and an elastomer. In addition, the thermoplastic resin can function as a modifier in a case of being used in combination with a thermosetting resin. Details are as follows.

In a case where the adhesive layer containing the thermosetting resin is cured, volume shrinkage may occur due to shortening of an interatomic distance caused by the addition reaction and/or condensation reaction of the thermosetting resin with other components (for example, a curing agent), and/or volatilization of low-molecular components added as components for forming the adhesive layer, low-molecular components generated by the reaction, solvents, and the like. As a result, stress is generated in the adhesive layer. In addition, in a case where the thermosetting resin is extracted from the heating environment for curing and placed at a room temperature, the thermosetting resin in the adhesive layer is rapidly cooled in a state in which the mobility of the thermosetting resin is lost due to curing, and shrinkage accompanying the cooling, so that stress in the adhesive layer is usually increased. In particular, in a case where the adhesive layer is bonded to the substrate and cured, the temperature of the adhesive layer on the substrate side is high and the opposite side is quenched, so that it is estimated that stress concentration may occur at a specific location due to a stress variation in the adhesive layer. As a result of the above, it is considered that cracks are likely to occur in the adhesive layer. Further, in the adhesive layer containing the magnetic powder, the particles of the magnetic powder are substantially rigid, and therefore cannot usually contribute to the relaxation of the stress generated in the adhesive layer. It is preferable to add a modifier in order to relax the stress generated in the adhesive layer as described above. It is also preferable that stress relaxation is possible by the addition of the modifier from the viewpoint of improving the adhesiveness between the adhesive layer and an adjacent portion (layer, substrate, or the like). For example, in a case where the adhesive layer after the bonding step is subjected to a peeling stress, it is considered that in a case where the stress in the adhesive layer can be relaxed, the stress concentration on the adhesive surface can be reduced, whereby the peeling of the adhesive layer from an adjacent portion can be suppressed. As the modifier, the molecular weight of the modifier is preferably 500 or more, more preferably 1000 or more, and still more preferably 2000 or more, from the viewpoint of less volatilization during a curing treatment of the adhesive layer containing the thermosetting resin and less precipitation during long-term storage. The upper limit of the molecular weight is not particularly limited. In the present invention and the present specification, the term "molecular weight" is a value obtained by a value measured by gel permeation chromatography (GPC) for a polymer in terms of polystyrene, unless otherwise noted. As the modifier, a thermoplastic resin is preferable from the viewpoint of softening by heating and exhibiting fluidity. In addition, it is preferable that the stress relaxation ability can be maintained until the adhesive layer containing the thermosetting resin is cooled to around a room temperature after the curing treatment, from the viewpoint of suppressing the generation of cracks. From this point of view, it is preferable that a glass transition temperature Tg of the thermoplastic resin is 30° C. or lower. In the present invention and the present specification, the glass transition temperature Tg is obtained as a baseline shift start temperature of the heat flow chart in a case of temperature rise from the measurement result of the heat flow measurement using a differential scanning calorimeter. The glass transition temperature Tg of the thermoplastic resin is more preferably 20° C. or lower, still more preferably 10° C. or lower, still more preferably 0° C. or lower, still more preferably −10° C. or lower, still more preferably −20° C. or lower, and still more preferably −30° C. or lower, from the viewpoint of further suppressing the generation of cracks. The glass transition temperature Tg of the thermoplastic resin may be, for example, −100° C. or higher, −90° C. or higher, or −80° C. or higher.

Examples of the thermoplastic resin include natural rubber and synthetic rubber, and examples of the synthetic rubber include butadiene rubber, chloroprene rubber, acrylonitrile butadiene rubber, styrene butadiene rubber, and silicone rubber.

Other examples of the thermoplastic resin include ethylene vinyl acetate copolymers, styrene butadiene block copolymers, and styrene isoprene block copolymers. These can also be elastomers.

In addition, other examples of the thermoplastic resin include general-purpose polymers, such as polyvinyl acetate, polyvinylidene chloride, and polyvinylidene fluoride.

As the thermoplastic resin, a commercially available thermoplastic resin or a thermoplastic resin synthesized by a known method may be used alone, or two or more types may be used in combination at an arbitrary ratio, in consideration of solubility in a component (for example, a solvent) used in combination. In a case where the adhesive layer contains a thermoplastic resin, the content of the thermoplastic resin in the adhesive layer is preferably 2 to 40 parts by mass, and more preferably 5 to 20 parts by mass with respect to 100 parts by mass of the FeCo-based magnetic powder.

Dispersing Agent

The adhesive layer of the adhesive sheet may also contain an additive (dispersing agent) that can contribute to the improvement in dispersibility of the FeCo-based magnetic powder. As a preferred dispersing agent from the viewpoint of reducing the thickness variation of the adhesive layer, a compound containing a polyalkyleneimine chain and a polyester chain can be used. From the viewpoint of further reducing the thickness variation of the adhesive layer, the proportion of the polyalkyleneimine chain in the compound (hereinafter, also referred to as a "polyalkyleneimine chain ratio") is preferably less than 5.0% by mass, and a number average molecular weight of the polyalkyleneimine chain contained in the compound is preferably in a range of 300 to 3000. Here, the number average molecular weight of the polyalkyleneimine chain means a number average molecular weight disclosed in paragraph 0027 of JP2015-28830A. For a method for measuring the number average molecular weight, paragraphs 0100 and 0101 of JP2015-28830A can also be referred to. The number average molecular weight of the polyalkyleneimine chain is more preferably 500 or more, and more preferably 2000 or less. On the other hand, the proportion of the polyalkyleneimine chain in the above compound (polyalkyleneimine chain ratio) is obtained according to the description in paragraph 0030 of JP2015-28830A. The polyalkyleneimine chain ratio is preferably 4.9% by mass or less, more preferably 4.8% by mass or less, still more preferably 4.5% by mass or less, still more preferably 4.0% by mass or less, and still more preferably 3.0% by mass or less. In addition, the polyalkyleneimine chain ratio is preferably 0.2% by mass or more, more preferably 0.3% by mass or more, and still more preferably 0.5% by mass or more.

As the polyalkyleneimine chain contained in the above compound, a polymerization structure containing two or more alkyleneimine chains represented by Formula A disclosed in paragraph 0032 of JP2015-28830A and/or Formula B disclosed in paragraph 0034 of the same publication can be used. In one aspect, the polyalkyleneimine chain may be a polyethyleneimine chain. On the other hand, as the polyester chain contained in the above compound, the polyester chain represented by Formula 1 disclosed in paragraph 0044 of JP2015-28830A and the polyester chain represented by Formula 2 disclosed in paragraph 0046 of the same publication can be used. For details of the above compound, paragraphs 0026 to 0070 of JP2015-28830A and the description of Examples of the same publication can be referred to. The adhesive layer of the adhesive sheet may contain a dispersing agent in an amount of 0.5 to 50 parts by mass, preferably in an amount of 1 to 40 parts by mass, and more preferably in an amount of 1 to 30 parts by mass with respect to 100 parts by mass of the FeCo-based magnetic powder. In one aspect, the adhesive layer of the adhesive sheet may contain a compound containing a polyalkyleneimine chain and a polyester chain (in a compound, preferably, the polyalkyleneimine chain ratio is less than 5.0% by mass, and more preferably, the number average molecular weight of the polyalkyleneimine chain is in a range of 300 to 3000) in an amount of 0.5 to 50 parts by mass, preferably in an amount of 1 to 40 parts by mass, and more preferably in an amount of 1 to 30 parts by mass with respect to 100 parts by mass of the FeCo-based magnetic powder.

(Method for Forming Adhesive Layer)

The adhesive layer of the adhesive sheet can be produced, for example, by drying a coating layer formed by applying a composition for forming an adhesive layer. The composition for forming an adhesive layer contains the components described above, and may optionally contain one or more solvents. Examples of the solvent include various organic solvents such as ketone solvents such as acetone, methyl ethyl ketone, and cyclohexanone, acetate solvents such as ethyl acetate, butyl acetate, cellosolve acetate, propylene glycol monomethyl ether acetate, and carbitol acetate, carbitols such as cellosolve and butylcarbitol, aromatic hydrocarbon solvents such as toluene and xylene, and amide solvents such as dimethylformamide, dimethylacetamide, and N-methylpyrrolidone. One solvent or two or more solvents selected in consideration of the solubility of the components used for preparing the composition for forming an adhesive layer can be mixed at an arbitrary ratio and used. The solvent content of the composition for forming an adhesive layer is not particularly limited, and need only be determined in consideration of the coatability of the composition for forming an adhesive layer.

The composition for forming an adhesive layer can be prepared by sequentially mixing various components in any order or mixing them simultaneously. In addition, as necessary, a dispersion treatment can be performed using a known disperser such as a ball mill, a bead mill, a sand mill, or a roll mill, and/or a stirring treatment can also be performed using a known stirrer such as a shaking type stirrer. It is preferable to improve the dispersibility of the FeCo-based magnetic powder in the composition for forming an adhesive layer by adjusting the treatment conditions of the dispersion treatment and the stirring treatment from the viewpoint of reducing the thickness variation of the adhesive layer.

The composition for forming an adhesive layer can usually be applied on a support. The application can be performed using a known coating device such as a blade coater or a die coater. The application can be performed by a so-called roll-to-roll method or a batch method.

Examples of the support to which the composition for forming an adhesive layer is applied include films of various resins such as polyesters such as polyethylene terephthalate (PET) and polyethylene naphthalate (PEN), polycarbonate (PC), acrylics such as polymethylmethacrylate (PMMA), cyclic polyolefins, triacetyl cellulose (TAC), polyether sulfide (PES), polyether ketone, and polyimide. For these resin films, paragraphs 0081 to 0086 of JP2015-187260A can be referred to. As the support, a support which is subjected to a peeling treatment by a known method on a surface (surface to which the composition for forming an adhesive layer is applied) can be used. One aspect of the peeling treatment includes forming a release layer. For the release layer, paragraph 0084 of JP2015-187260A can be referred to. In addition, as the support, a commercially available peeling-treated resin film can be used. By using a support whose surface to be coated is subjected to the peeling treatment, the adhesive layer and the support can be easily separated from each other after performing the bonding step using the adhesive sheet.

The coating layer formed by applying the composition for forming an adhesive layer can be subjected to a drying treatment by a known method, such as heating or blowing hot air. The drying treatment can be performed, for example, under conditions that can volatilize the solvent contained in the composition for forming an adhesive layer. In a case where the composition for forming an adhesive layer contains a thermosetting resin, it is preferable to perform the drying treatment at a temperature at which the curing reaction of the thermosetting resin does not start or does not proceed sufficiently. As an example, the drying treatment can be performed for 1 minute to 2 hours in a heated atmosphere having an atmosphere temperature of 80° C. to 150° C.

The adhesive sheet may be a sheet composed of only the adhesive layer in one aspect, and may be a sheet in which the adhesive layer and the support are laminated in another aspect. In addition, in another aspect, a protective film may be provided on a surface of the adhesive layer opposite to the support side. In the aspect in which the adhesive layer has the protective film and/or the support, the protective film and/or the support can protect the adhesive layer from the generation of scratches, adhesion of deposits, and the like. As the protective film, for example, a commercially available film can be used. For the protective film, paragraphs 0096 and 0097 of JP2015-187260A can be referred to.

The adhesive sheet described above is suitable as an adhesive sheet for forming an adhesive layer on an electronic component.

[Electronic Component]

Another aspect of the present invention relates to an electronic component including an adhesive layer containing a FeCo-based magnetic powder having an average primary particle size of 100 nm or less and a coercive force Hc of 400 Oe or more, and having a thickness variation of less than 10%.

Hereinafter, the above electronic component will be described in more detail.

The electronic component can be preferably manufactured through a bonding step using the adhesive sheet. The bonding step can be performed using, for example, a commercially available laminating machine or a laminating machine having a known configuration. For the laminating step, paragraphs 0127 and 0128 of JP2015-187260A can be referred to. For example, in a case where an adhesive sheet containing a support and an adhesive layer is used, the bonding step can be performed by superimposing a surface of the adhesive layer opposite to the support side on a surface to be bonded to the adhesive layer. The surface to be bonded to the adhesive layer may be a surface of a continuous layer or a surface of a discontinuous layer. For example, an inductor generally called a planar inductor is usually produced by patterning a metal flat plate, such as a copper plate. In one aspect, a surface of the metal flat plate before such patterning may be the surface to be bonded to the adhesive layer. In addition, in another aspect, a surface of the planar inductor (metal discontinuous layer) produced by such patterning may be the surface to be bonded to the adhesive layer.

It is preferable to perform a heat treatment after the bonding step, in order to progress the curing reaction of the thermosetting resin in the adhesive layer containing the thermosetting resin. The progress of the curing reaction of the thermosetting resin can contribute to the improvement in adhesive strength of the adhesive layer. The heating conditions for such heat treatment need only be determined according to the type of the component (thermosetting resin, curing agent, and or like) contained in the adhesive layer and the composition of the adhesive layer. As an example, the heat treatment can be performed to progress the curing reaction for 5 minutes to 12 hours in a heated atmosphere having an atmosphere temperature of 120° C. to 240° C. (preferably 150° C. to 210° C.). In a case where an adhesive sheet containing a substrate and an adhesive layer is used, the heat treatment may be performed after the substrate and the adhesive layer are separated from each other, or may be performed before the separation.

The details of the various components contained in the adhesive layer are as described in detail above with respect to the adhesive sheet.

The electronic component can be preferably an electronic component including an inductor element. An operating frequency of the inductor element can be, for example, a high frequency band of about 1 GHz. Examples of such an electronic component include a wiring board. For the electronic component, a known technique relating to the electronic component can be applied except that the adhesive layer is included. For example, for details of the wiring board, paragraphs 0098 to 0155 of JP2015-187260A and FIGS. 1 to 3 of the same publication can be referred to. The wiring board may further include a semiconductor chip or the like. In addition, various types of semiconductor devices can be manufactured by using such a wiring board. The semiconductor device including such a wiring board can be suitably used for a high-frequency device such as an automobile, a mobile information terminal such as a mobile phone, a flat panel display, a game device, a road information system, and a wireless LAN.

EXAMPLES

Hereinafter, the present invention will be described in more detail with reference to Examples. Here, the present invention is not limited to embodiments shown in Examples.

[Measurement Method]

The physical properties of the magnetic powder and the resin described below and the dispersed particle size of the magnetic powder in the composition for forming an adhesive layer are values measured by the following methods.

<Average Primary Particle Size of Magnetic Powder>

The average primary particle size of the magnetic powder is a value measured by the method described above using transmission electron microscope H-9000 manufactured by Hitachi, Ltd. as a transmission electron microscope, and image analysis software KS-400 manufactured by Carl Zeiss as image analysis software.

<Coercive Force Hc of Magnetic Powder>

The coercive force Hc of each magnetic powder was measured at a magnetic field strength of 15000 Oe using a vibrating sample magnetometer (manufactured by Toei Industry Co., Ltd.), and the coercive force Hc was obtained from the obtained hysteresis curve (called "M-H curve").

<Glass Transition Temperature Tg of Modifier>

Each modifier (pellet or powder sample) was placed in an aluminum sample pan, sealed by a press machine, and heat flow measurement was performed under the following conditions using Q100 manufactured by TA Instruments as a differential scanning calorimeter. From the measurement results, the glass transition temperature of the modifier was obtained as a baseline shift start temperature in the heat flow chart in a case of temperature rise.

(Measurement Condition)

Scan temperature: −80.0° C. to 200.0° C.

Temperature increase rate: 10.0° C./min

<Dispersed Particle Size of Magnetic Powder in Composition for Forming Adhesive Layer>

A portion of the composition for forming an adhesive layer prepared by the method described below was collected and diluted to 1/50 by mass with the solvent used for preparing this composition, to prepare a sample solution. For this sample solution, an arithmetic average particle size measured using a light scattering type particle size distribution diameter (LB500 manufactured by Horiba. Ltd.) was defined as the dispersed particle size. It can be said that the smaller the value of the dispersed particle size obtained in this way, the higher the dispersibility of the magnetic powder in the composition.

[Dispersing Agent]

The dispersing agent shown in Table 1 below is as follows.

Dispersing agent 1: Polyalkyleneimine derivative J-2 of Synthesis Example 22 of JP2015-28830A (polyalkyleneimine chain ratio: 2.3% by mass, number average molecular weight of polyalkyleneimine chain: 600)

Dispersing agent 2: Polyalkyleneimine derivative J-1 of Synthesis Example 21 of JP2015-28830A (polyalkyleneimine chain ratio: 4.8% by mass, number average molecular weight of polyalkyleneimine chain: 1800)

Dispersing agent 3: Polyalkyleneimine derivative J-3 of Synthesis Example 23 of JP2015-28830A (polyalkyleneimine chain ratio: 4.3% by mass, number average molecular weight of polyalkyleneimine chain: 1200)

Dispersing agent A: Dispersing agent disclosed in Example 2 of JP1993-177123A (JP-H5-177123A)

Dispersing agent B: Acrylic copolymer P-1 used in Example 1-1 of JP2011-216149A Dispersing agent C: BYK-111 manufactured by BYK Chemie Japan Dispersing agent D: BYK-106 manufactured by BYK Chemie Japan

[Modifier]

The modifier shown in Table 1 below is the following thermoplastic resin.

NBR: Acrylonitrile butadiene rubber (N215SL manufactured by JSR Corporation)

PVAc: Polyvinyl acetate (model number 183265000 manufactured by ACROS ORGANICS)

SBS: Styrene-butadiene block copolymer (model number 432490 (polystyrene-block-polybutadiene-block-polystyrene) manufactured by Aldrich Co., LLC.)

PMMA: Polymethylmethacrylate (model number 445746 manufactured by Aldrich Co., LLC.)

PBMA: Polybenzylmethacrylate (model number 181358 manufactured by Aldrich Co., LLC.)

[Magnetic Powder]

In Table 1 below, "FeCo" indicates a FeCo-based magnetic powder, and "Fe-based amorphous" indicates a magnetic powder not corresponding to a FeCo-based magnetic powder, which is model number AW2-08 PF-3F (Fe-based amorphous magnetic powder) manufactured by Epson Atmix Corporation.

Example 1

<Preparation of Dispersion of Magnetic Powder>

100 parts by mass of a FeCo-based powder (see Table 1), 8 parts by mass of a dispersing agent (see Table 1), 250 parts by mass of methyl ethyl ketone, and 500 parts by mass of zirconia ball (YTZ-1 manufactured by Nikkato Corporation, diameter: 1 mm) were mixed in a plastic bottle, dispersed in a ball mill for 24 hours, and then separated from the zirconia ball by a PET mesh having a pore size of 72 μm, to obtain a dispersion of the magnetic powder.

<Preparation of Composition for Forming Adhesive Layer>

Separately from the above, a thermosetting resin (8 parts by mass of an epoxy resin (jER1256 manufactured by Mitsubishi Chemical Corporation) and 8 parts by mass of an epoxy resin (jER157S70 manufactured by Mitsubishi Chemical Corporation)), 13 parts by mass of a modifier (see Table 1), and 50 parts by mass of methyl ethyl ketone were mixed in a plastic bottle, mixed for 6 hours by a shaking type stirrer, and dissolved. 0.5 parts by mass of an imidazole type curing agent (jER Cure IBMI12 manufactured by Mitsubishi Chemical Corporation) and a dispersion of the magnetic powder prepared above were added to the plastic bottle, and the mixture was mixed by a shaking type stirrer for 30 minutes.

Thus, a composition for forming an adhesive layer was prepared.

<Production of Adhesive Sheet>

The composition for forming an adhesive layer was applied to the peeled surface of a commercially available peeled PET film (PET75TR manufactured by NIPPA Corporation) by a blade coater having a coating gap of 200 μm, and dried in a drying device having an internal atmosphere temperature of 70° C. for 1 hour, thereby producing an adhesive sheet having an adhesive layer on a PET film (support).

[Evaluation Method]

<Thickness Variation and Magnetic Permeability of Adhesive Layer>

The adhesive sheet produced above was heated together with the PET film in an oven having an internal atmosphere temperature of 150° C. for 2 hours to perform a curing treatment on the adhesive layer.

After that, the adhesive layer (the cured layer of the composition for forming an adhesive layer) was peeled from the PET film, and cut to have a rectangular shape of 2 mm×10 mm to obtain a rectangular sample. The thickness of the adhesive layer of this rectangular sample was measured by a micrometer at 10 randomly selected locations. The arithmetic average of the thickness was 40 μm, and the thickness variation was the value shown in Table 1.

In addition, the magnetic permeabilities μ' and μ" of the rectangular sample at 1 GHz were measured using a magnetic permeability measuring device per01 (manufactured by Keycom Co., Ltd.), and the loss tangent tan δ was calculated from the measured μ' and μ".

<Calculation of Inductance Variation>

A sample in which adhesive layers were formed on both surfaces of the planar inductor having the configuration shown in FIG. 1 in the same manner as described above was assumed, an inductance L of the sample was calculated by the following equation. In FIG. 1, the left figure is a schematic plan view of the planar inductor, and the right figure is a schematic cross-sectional view of a sample in which adhesive layers are formed on both surfaces of the planar inductor. In calculating the inductance L, the inductor width a=10 mm, the number of turns N=3, the distance between conductors dc=2 mm, the conductor width Wc=0.1 mm, and the vacuum magnetic permeability μ0=1.257×10⁻⁶ m kgs⁻²A⁻² were set, and μ' obtained above was used as μr in the following equation. As the thickness tm of the adhesive layer, the inductance L was calculated using the value of the thickness obtained for each of the above 10 locations. Among the 10 calculated inductance values obtained in this way, the inductance calculated using the maximum value of the thickness was defined as Lmax, the inductance calculated using the minimum value was defined as Lmin, and the arithmetic average of the 10 calculated inductance values was defined as Lave, whereby the inductance variation was obtained as "Inductance variation (%)= [(Lmax−Lmin)/Lave]×100".

$$L = \frac{1}{2} N \mu_0 a \sqrt{\frac{d_c}{w_c}} + \frac{N \mu_0 a}{\frac{t_m}{d_i} + \frac{w_c}{\mu_i t_m}}$$

<Observation of Cracks and Adhesiveness Test>

The adhesive sheet produced by the above method was bonded at a roll temperature of 130° C. by a roll-type laminating machine (RSH-380SL manufactured by Japan Office Laminator Co., Ltd.) such that the surface of the adhesive layer opposite to the PET film side and the surface of a copper plate having a plate thickness of 0.3 mm are bonded to each other. After the bonding, the PET film was removed and then heated in an oven having an internal atmosphere temperature of 150° C. for 2 hours to perform a curing treatment on the adhesive layer.

The adhesive layer after the curing treatment was observed by an optical microscope at an observation magnification of 200 to confirm the presence or absence of cracks. A case where no cracks were confirmed was designated as "A", and a case where cracks were confirmed was designated as "B".

For the adhesive layer after the curing treatment, the adhesiveness of the adhesive layer was evaluated in accordance with Japanese Industrial Standards (JIS) K 5600-5-6 (1999) "Adhesion (cross-cut method)". Specifically, six lattice cuts were formed in the adhesive layer to reach the copper plate at intervals of 1 mm using a cutter, and a cellophane tape (width of 18 mm, made by Nichiban Co., Ltd.) was bonded to the adhesive layer and then peeled off therefrom. From the residual state of the adhesive layer, the adhesiveness was evaluated in accordance with Table 1 "Classification of test results" in the above JIS. The smaller the number of classification assigned as the evaluation result, the higher the adhesiveness. Therefore, in Table 2 described below, "0" means that the adhesiveness is the highest.

Examples 2 and 3

An adhesive sheet was produced in the same manner as in Example 1 except that the modifier shown in Table 1 was used instead of NBR, and the produced adhesive sheet was evaluated by the above method.

Examples 4, 11, and 12 and Comparative Examples 1, 6, and 7

An adhesive sheet was produced in the same manner as in Example 1 except that the magnetic powder shown in Table 1 was used as the magnetic powder, and the produced adhesive sheet was evaluated by the above method.

Examples 5 and 6 and Comparative Examples 2 to 5

An adhesive sheet was produced in the same manner as in Example 1 except that the dispersing agent shown in Table 1 was used as the dispersing agent, and the produced adhesive sheet was evaluated by the above method.

Example 7

An adhesive sheet was produced in the same manner as in Example 1 except that a thermosetting resin (epoxy resin) was not used, and the produced adhesive sheet was evaluated by the above method.

Example 8

An adhesive sheet was produced in the same manner as in Example 1 except that NBR was not used, and the produced adhesive sheet was evaluated by the above method.

Examples 9 and 10

An adhesive sheet was produced in the same manner as in Example 1 except that the modifier shown in Table 1 was used instead of NBR, and the produced adhesive sheet was evaluated by the above method.

The above results are shown in Tables 1 and 2.

TABLE 2

| | Magnetic permeability $\mu'$ | Loss tangent tan δ | Inductance Variation [%] | Adhesiveness JIS K 5600 Classification | Crack |
|---|---|---|---|---|---|
| Example 1 | 2.10 | 0.038 | 1.8 | 0 | A |
| Example 2 | 2.09 | 0.038 | 2.1 | 0 | A |
| Example 3 | 2.09 | 0.038 | 2.1 | 0 | A |
| Example 4 | 3.18 | 0.079 | 2.4 | 0 | A |
| Example 5 | 2.08 | 0.034 | 2.1 | 0 | A |
| Example 6 | 2.05 | 0.044 | 2.1 | 0 | A |
| Example 7 | 2.07 | 0.039 | 2.1 | 3 | A |
| Example 8 | 2.06 | 0.034 | 2.1 | 0 | B |
| Example 9 | 2.08 | 0.038 | 2.1 | 2 | B |
| Example 10 | 2.09 | 0.038 | 2.1 | 1 | B |
| Example 11 | 2.35 | 0.047 | 2.3 | 0 | A |
| Example 12 | 2.01 | 0.030 | 2.0 | 0 | A |
| Comparative Example 1 | 3.50 | 0.257 | 3.2 | 0 | A |
| Comparative Example 2 | 1.85 | 0.038 | 2.9 | 0 | A |
| Comparative Example 3 | 1.83 | 0.038 | 2.8 | 0 | A |
| Comparative Example 4 | 1.84 | 0.038 | 2.9 | 0 | A |
| Comparative Example 5 | 1.74 | 0.034 | 3.0 | 0 | A |
| Comparative Example 6 | 6.86 | 0.320 | 6.7 | 0 | A |
| Comparative Example 7 | 2.20 | 0.082 | 2.2 | 0 | A |

From Tables 1 and 2, it can be confirmed that according to the adhesive sheet of Examples 1 to 12, both the high magnetic permeability $\mu'$ and the small loss tangent tan δ can be achieved in a high frequency band, and further, inductance variation can be suppressed.

TABLE 1

| | Magnetic powder | | | | Thermo-setting resin | Modifier | | Composition for forming adhesive layer | Adhesive layer |
|---|---|---|---|---|---|---|---|---|---|
| | Type | Average primary particle size [nm] | Coercive force Hc [Oe] | Dispersing agent | | Type | Glass transition temperature | Dispersed particle size [μm] | Thickness variation [%] |
| Example 1 | FeCo | 45 | 760 | Dispersing agent 1 | Present | NBR | Tg−40° C. | 0.4 | 7 |
| Example 2 | FeCo | 45 | 760 | Dispersing agent 1 | Present | PVAc | Tg28° C. | 0.3 | 8 |
| Example 3 | FeCo | 45 | 760 | Dispersing agent 1 | Present | SBS | Tg−50° C. | 0.4 | 8 |
| Example 4 | FeCo | 75 | 400 | Dispersing agent 1 | Present | NBR | Tg−40° C. | 0.3 | 7 |
| Example 5 | FeCo | 45 | 760 | Dispersing agent 2 | Present | NBR | Tg−40° C. | 0.4 | 8 |
| Example 6 | FeCo | 45 | 760 | Dispersing agent 3 | Present | NBR | Tg−40° C. | 0.4 | 8 |
| Example 7 | FeCo | 45 | 760 | Dispersing agent 1 | Absent | NBR | Tg−40° C. | 0.4 | 8 |
| Example 8 | FeCo | 45 | 760 | Dispersing agent 1 | Present | — | — | 0.4 | 8 |
| Example 9 | FeCo | 45 | 760 | Dispersing agent 1 | Present | PMMA | Tg92° C. | 0.4 | 8 |
| Example 10 | FeCo | 45 | 760 | Dispersing agent 1 | Present | PBMA | Tg54° C. | 0.4 | 8 |
| Example 11 | FeCo | 40 | 800 | Dispersing agent 1 | Present | NBR | Tg−40° C. | 0.4 | 8 |
| Example 12 | FeCo | 45 | 1180 | Dispersing agent 1 | Present | NBR | Tg−40° C. | 0.4 | 8 |
| Comparative Example 1 | FeCo | 135 | 230 | Dispersing agent 1 | Present | NBR | Tg−40° C. | 0.5 | 9 |
| Comparative Example 2 | FeCo | 45 | 760 | Dispersing agent A | Present | NBR | Tg−40° C. | 1.2 | 12 |
| Comparative Example 3 | FeCo | 45 | 760 | Dispersing agent B | Present | NBR | Tg−40° C. | 1.2 | 12 |
| Comparative Example 4 | FeCo | 45 | 760 | Dispersing agent C | Present | NBR | Tg−40° C. | 1.2 | 12 |
| Comparative Example 5 | FeCo | 45 | 760 | Dispersing agent D | Present | NBR | Tg−40° C. | 1.4 | 13 |
| Comparative Example 6 | Fe-based amorphous | 3000 | 2 | Dispersing agent 1 | Present | NBR | Tg−40° C. | 3.0 | 14 |
| Comparative Example 7 | FeCo | 75 | 375 | Dispersing agent 1 | Present | NBR | Tg−40° C. | 0.4 | 8 |

17

INDUSTRIAL APPLICABILITY

One aspect of the present invention is useful in the technical field of various electronic components.

What is claimed is:

1. An adhesive sheet comprising:
an adhesive layer containing a FeCo-based magnetic powder having an average primary particle size of 100 nm or less and a coercive force Hc of 400 Oe or more and a thermoplastic resin having a glass transition temperature Tg of –50° C. or higher and 30° C. or lower, and having a thickness variation of less than 10%.

2. The adhesive sheet according to claim 1, wherein the adhesive layer further contains a thermosetting resin.

3. The adhesive sheet according to claim 2, wherein the thermosetting resin is an epoxy resin.

4. The adhesive sheet according to claim 1, wherein the adhesive layer further contains a compound containing a polyalkyleneimine chain and a polyester chain.

5. The adhesive sheet according to claim 4, wherein a proportion of the polyalkyleneimine chain in the compound is less than 5.0% by mass.

6. The adhesive sheet according to claim 1, wherein the average primary particle size of the FeCo-based magnetic powder is 30 nm or more and 100 nm or less.

7. The adhesive sheet according to claim 1, wherein the coercive force Hc of the FeCo-based magnetic powder is 400 Oe or more and 1500 Oe or less.

8. The adhesive sheet according to claim 1, wherein the thickness variation of the adhesive layer is 5% or more and less than 10%.

9. An electronic component comprising:
an adhesive layer containing a FeCo-based magnetic powder having an average primary particle size of 100 nm or less and a coercive force Hc of 400 Oe or more and a thermoplastic resin having a glass transition temperature Tg of –50° C. or higher and 30° C. or lower, and having a thickness variation of less than 10%.

10. The electronic component according to claim 9, wherein the adhesive layer further contains a thermosetting resin.

11. The electronic component according to claim 10, wherein the thermosetting resin is an epoxy resin.

12. The electronic component according to claim 9, wherein the adhesive layer further contains a compound containing a polyalkyleneimine chain and a polyester chain.

13. The electronic component according to claim 12, wherein a proportion of the polyalkyleneimine chain in the compound is less than 5.0% by mass.

14. The electronic component according to claim 9, wherein the average primary particle size of the FeCo-based magnetic powder is 30 nm or more and 100 nm or less.

15. The electronic component according to claim 9, wherein the coercive force Hc of the FeCo-based magnetic powder is 400 Oe or more and 1500 Oe or less.

16. The electronic component according to claim 9, wherein the thickness variation of the adhesive layer is 5% or more and less than 10%.

* * * * *